US012565059B1

(12) United States Patent
Gala

(10) Patent No.: US 12,565,059 B1
(45) Date of Patent: Mar. 3, 2026

(54) RING BINDER MECHANISM

(71) Applicant: Navneet Education Limited, Mumbai (IN)

(72) Inventor: Ketan Gala, Mumbai (IN)

(73) Assignee: Navneet Education Limited, Mumbai (IN)

( * ) Notice: Subject to any disclaimer, the term of this patent is extended or adjusted under 35 U.S.C. 154(b) by 0 days.

(21) Appl. No.: 18/975,613

(22) Filed: Dec. 10, 2024

(30) Foreign Application Priority Data

Aug. 30, 2024 (IN) ............................ 202421065516

(51) Int. Cl.
*B42F 13/26* (2006.01)

(52) U.S. Cl.
CPC .................................. *B42F 13/26* (2013.01)

(58) Field of Classification Search
CPC ...................................................... B42F 13/26
USPC ........ 402/19, 20, 21, 22, 46, 48, 49, 55, 56, 402/58, 70, 73, 74, 75, 76, 502
See application file for complete search history.

(56) References Cited

U.S. PATENT DOCUMENTS 2,543,866 A * 3/1951 Panfil, Sr. .............. B42F 13/18 402/26
3,833,308 A * 9/1974 Seaborn ................. B42F 13/18 402/56
2006/0228164 A1 10/2006 Horn

FOREIGN PATENT DOCUMENTS

| | | | |
|---|---|---|---|
| CN | 2470121 | Y | 1/2002 |
| CN | 210792550 | U | 6/2020 |
| CN | 211543016 | U | 9/2020 |
| CN | 211617180 | U | 10/2020 |
| CN | 218839021 | U | 4/2023 |
| CN | 219706523 | U | 9/2023 |
| GB | 700113 | A | 11/1953 |

* cited by examiner

*Primary Examiner* — Justin V Lewis
(74) *Attorney, Agent, or Firm* — Sughrue Mion, PLLC

(57) ABSTRACT

The present disclosure provides a ring binder mechanism comprising a first member having a locking element, a second member having a slot, and with the second member being pivotally connected to the first member by one or more pivoting arms. The ring binder mechanism further comprises a plurality of rings, each ring having a first ring portion on the first member, and a second ring portion on the second member. Herein, the locking element is configured to engage with the slot, to lock the first member and the second member with respect to each other and dispose the ring binder mechanism in a closed position; and to disengage from the slot when applied with an external pressure, to allow for relative movement of the first member and the second member with respect to each other and dispose the ring binder mechanism in an open position.

8 Claims, 9 Drawing Sheets

RING BINDER MECHANISM

FIELD OF THE PRESENT DISCLOSURE

The present disclosure to ring binder mechanisms used for organizing and securing loose sheets or documents. More specifically, the present disclosure pertains to a ring binder mechanism that facilitates easy and safe operation, suitable for use in personal, educational, and professional environments.

BACKGROUND

Ring binder mechanisms are widely used for organizing and storing documents, notes, and other materials. These mechanisms typically include a series of rings that open and close to secure the punched holes of the paper or other media. Traditional ring binder mechanisms often rely on a snapping or spring-loaded mechanism to open and close the rings. These mechanisms can require substantial force to operate, making them difficult to use with one hand and potentially causing discomfort or injury during repeated use. Additionally, the snapping action can be noisy and disruptive in quiet environments. Moreover, the metal components are prone to corrosion and are not environmentally friendly due to difficulties in recycling mixed materials.

To address these issues, some ring binder mechanisms have incorporated alternative opening and closing methods, such as lever-based or sliding mechanisms. However, these mechanisms can be complex, adding to the overall cost and potential points of failure. Furthermore, they may not provide a secure enough closure to prevent accidental opening of the rings, leading to the loss or disorganization of documents. Another challenge with conventional ring binder mechanisms is their environmental impact. Many mechanisms are made from non-recyclable materials, such as metal or mixed-material plastics, contributing to waste and pollution. There is a growing demand for more sustainable and eco-friendly solutions in various industries, including office supplies.

Therefore, there is a need for a ring binder mechanism that is easy to operate with a single hand, provides a secure closure, and is constructed from recyclable materials to minimize environmental impact. The present invention addresses these needs by providing a ring binder mechanism that overcomes the limitations of existing solutions.

Objective

The objective of the present disclosure is to provide an improved ring binder mechanism that is easy to operate with a single hand, provides a secure closure to prevent accidental opening, and is constructed from recyclable materials to minimize environmental impact. More specifically, the ring binder mechanism is designed to enable effortless opening and closing of the rings with a single hand, eliminating the need for excessive force or complex manoeuvres often associated with traditional mechanisms. Further, the ring binder mechanism is designed to offer a user-friendly design that prioritizes ease of use, convenience, and reliability, catering to a wide range of users and applications. Furthermore, the ring binder mechanism is designed to reduce manufacturing complexity and costs, making it an affordable and accessible solution.

SUMMARY

In one aspect, the present disclosure provides a ring binder mechanism. The ring binder mechanism comprises a first member. The first member has a locking element. The ring binder mechanism also comprises a second member. Further, the second member is pivotally connected to the first member by one or more pivoting arms. The ring binder mechanism further comprises a plurality of rings. Each ring has a first ring portion on the first member, and a second ring portion on the second member. Herein, the locking element is configured to engage with a slot formed in the second member, to lock the first member and the second member with respect to each other and dispose the ring binder mechanism in a closed position. Further, the locking element is configured to disengage from the slot when applied with an external pressure, to allow for relative movement of the first member and the second member with respect to each other and dispose the ring binder mechanism in an open position. In the present configuration, when the first member and the second member are in the closed position, the first ring portions and second ring portions are disposed to complete the respective rings.

In some embodiments, each of the one or more pivoting arms comprises two protrusions that engage with corresponding holes in the first member and the second member, to pivotally connect the second member to the first member.

In some embodiments, each protrusion on the pivoting arms has a top portion that is flexible and wider than a bottom portion thereof. The top portions of the protrusions are configured to engage with respective holes in the first member and the second member.

In some embodiments, the first member includes a plurality of first slots to accommodate the one or more pivoting arms when in the closed position, and the second member includes a plurality of second slots corresponding to the first slots.

In some embodiments, the ring binder mechanism further comprises visual indicators formed on the second member to indicate to user a direction in which the second member is to be moved with respect to the first member when transitioning between the open and closed positions.

In some embodiments, the first member, the second member, the pivoting arms, and the rings are formed from a polymer material.

In some embodiments, the polymer material comprises acrylonitrile butadiene styrene (ABS) polymer.

In some embodiments, the ring binder mechanism further comprises one or more fasteners configured to engage with apertures formed in the first member and a binder file, to support the ring binder mechanism with the binder file.

In another aspect, the present invention provides a binder stationery. The binder stationery comprises a binder file. The binder stationery further comprises a ring binder mechanism. The ring binder mechanism comprises a first member having a locking element. The ring binder mechanism also comprises a second member pivotally connected to the first member by one or more pivoting arms. The ring binder mechanism further comprises a plurality of rings. Each ring has a first ring portion on the first member, and a second ring portion on the second member. The ring binder mechanism further comprises one or more fasteners configured to engage with apertures formed in the first member and the binder file, to support the ring binder mechanism with the binder file. Herein, the locking element is configured to engage with a slot formed in the second member, to lock the first member and the second member with respect to each other and dispose the ring binder mechanism in a closed position. Further, the locking element is configured to disengage from the slot when applied with an external pressure, to allow for relative movement of the first member and the second member with respect to each other and dispose the ring binder mechanism in an open position. In the present configuration, when the first member and the second member are in the closed position, the first ring portions and second ring portions are disposed to complete the respective rings.

In some embodiments, the first member, the second member, the pivoting arms, and the rings are formed from a polymer material.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which.

DETAILED DESCRIPTION

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

The terminology used in the description presented herein is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this description below.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Figure 1A:
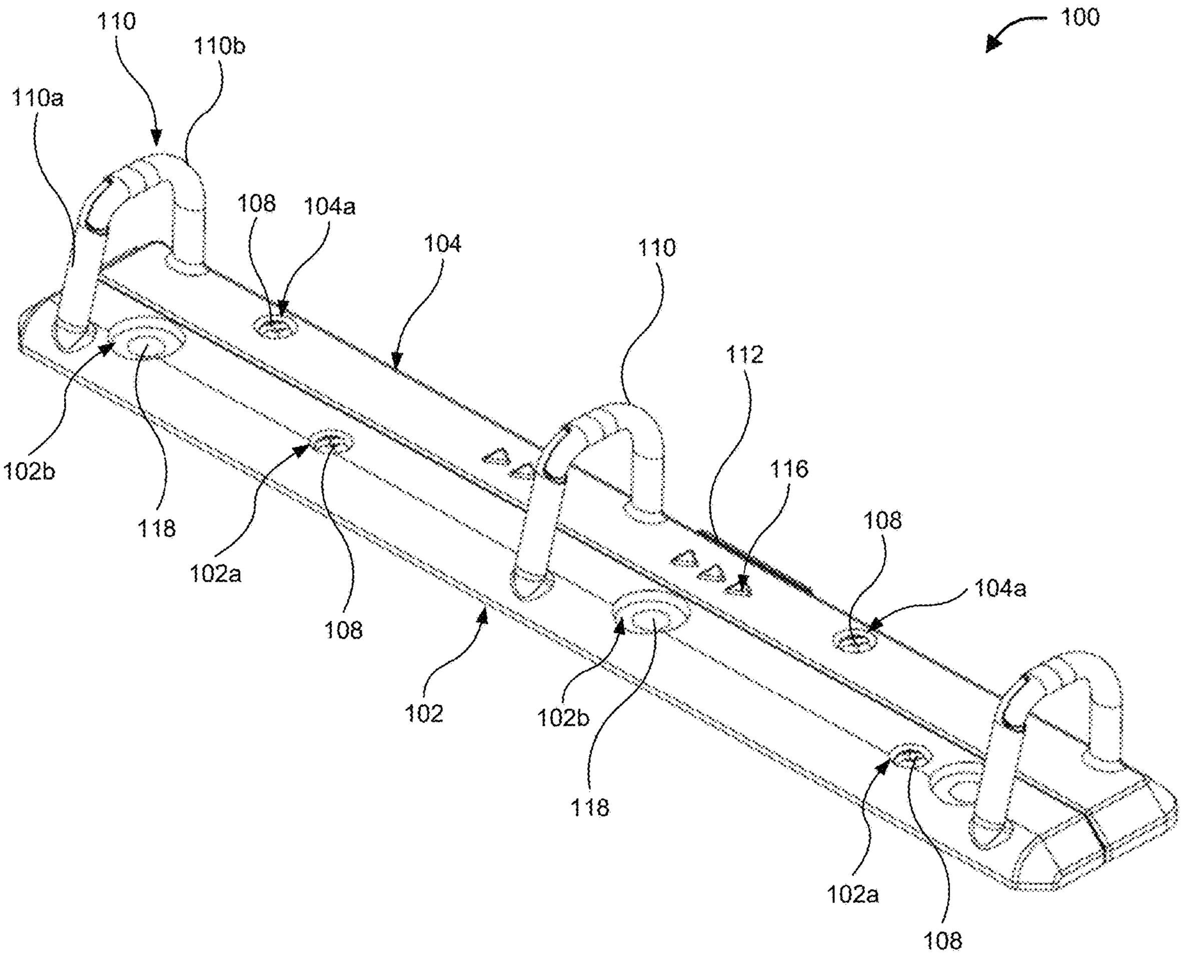
FIG. 1A illustrates a diagrammatic perspective view representation of a ring binder mechanism in a closed position thereof, in accordance with one or more embodiments of the present disclosure.
Figure 1B:
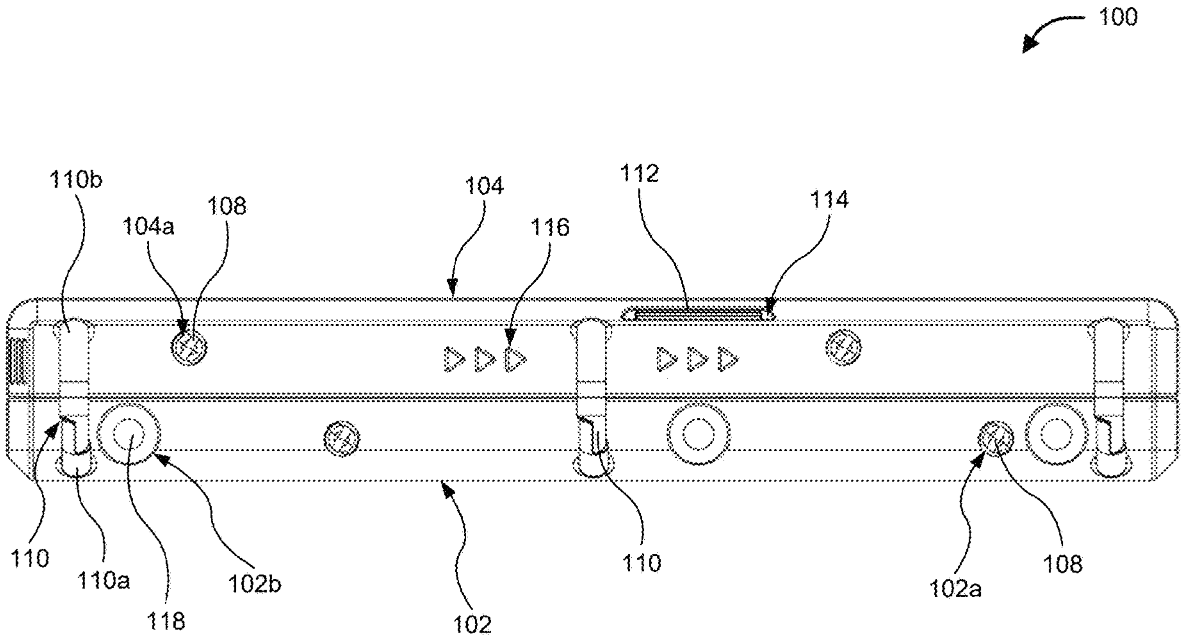
FIG. 1B illustrates a diagrammatic top view representation of the ring binder mechanism in the closed position thereof, in accordance with one or more embodiments of the present disclosure.
Figure 2A:
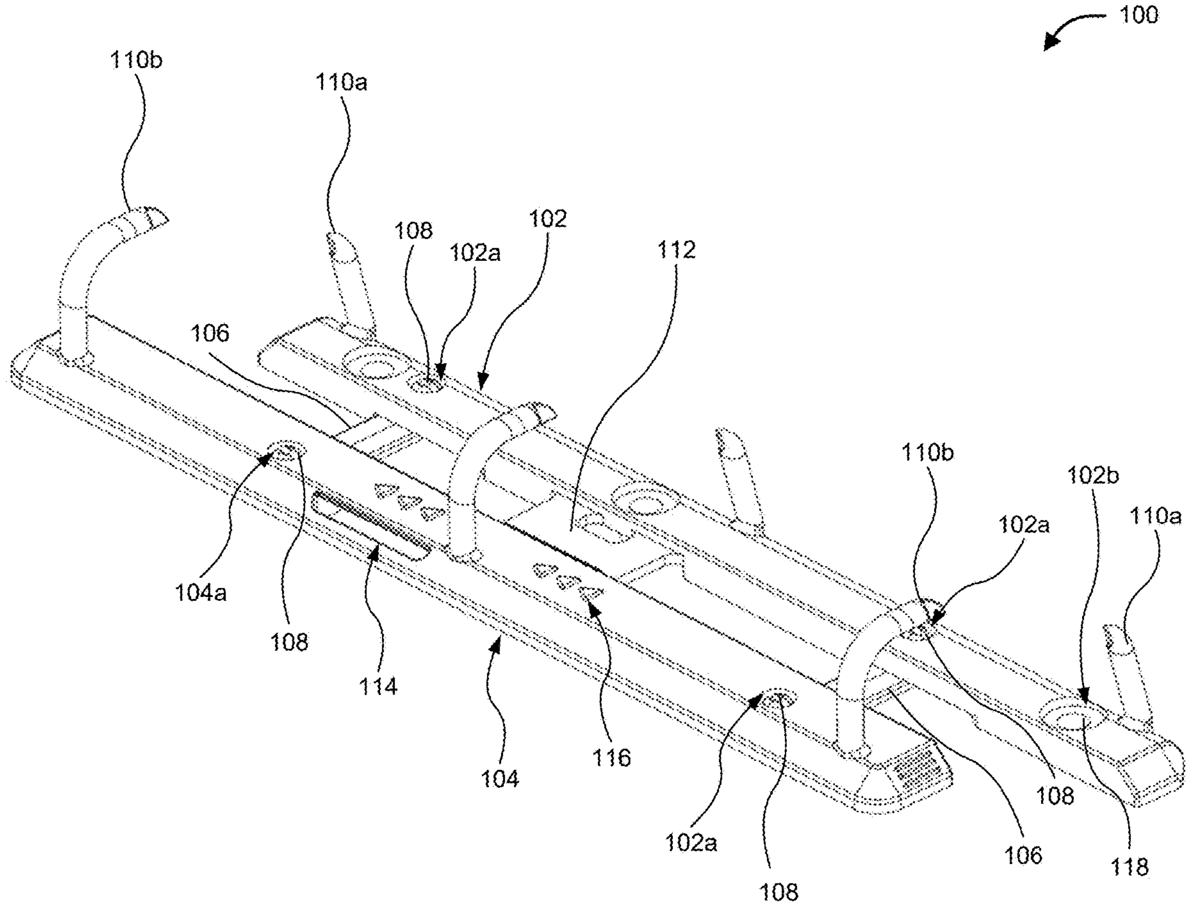
FIG. 2A illustrates a diagrammatic perspective view representation of the ring binder mechanism in an open position thereof, in accordance with one or more embodiments of the present disclosure.
Figure 2B:
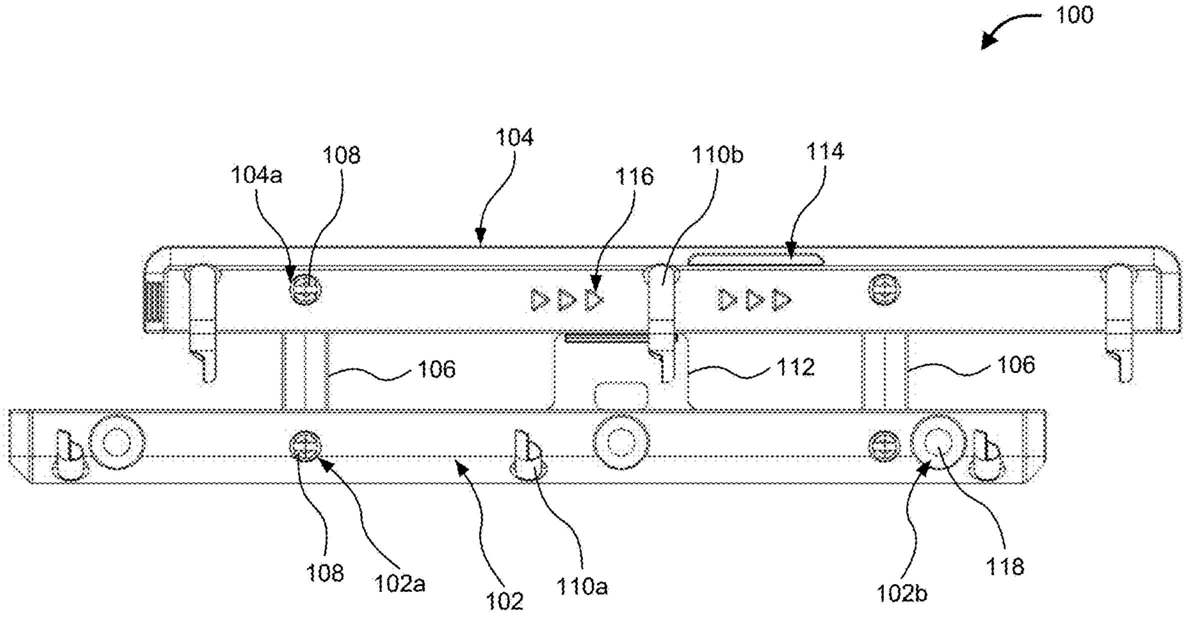
FIG. 2B illustrates a diagrammatic top view representation of the ring binder mechanism in the open position thereof, in accordance with one or more embodiments of the present disclosure.

Referring to FIGS. 1A-1B and 2A-2B, illustrated are different views of a ring binder mechanism (as represented by reference numeral 100), in accordance with one or more embodiments of the present disclosure. In particular, FIG. 1A illustrates a perspective view of the ring binder mechanism 100 from one side and FIG. 1B illustrates a top planar view of the ring binder mechanism 100, in a closed position thereof; whereas FIG. 2A illustrates a perspective view of the ring binder mechanism 100 from opposite side and FIG. 2B illustrates a top planar view of the ring binder mechanism 100, in an open position thereof. The ring binder mechanism 100 of the present disclosure provides a novel and advanced approach to document organization systems in file binders, which are typically employed for binding papers together. The ring binder mechanism 100 introduces a comprehensive redesign of traditional ring binders, integrating modern materials and engineering principles to enhance user interaction, safety, and environmental sustainability. The ring binder mechanism 100 is designed to efficiently manage the challenges commonly associated with conventional binders, such as case of use, safety concerns, and material sustainability.

As illustrated, the ring binder mechanism 100 includes a first member 102 and a second member 104. The first member 102 and the second member 104 of the ring binder mechanism 100 are designed to function collaboratively to provide a secure, reliable, and user-friendly means of managing and securing documents. As shown, the first member 102 includes holes 102*a* and the second member 104 includes holes 104*a*. As shown, the holes 102*a*, 104*a* are disposed along longitudinal lengths of the first member 102 and the second member 104, respectively. In the present configuration, the second member 104 of the ring binder mechanism 100 is pivotally connected to the first member 102 through the use of one or more pivoting arms 106. Herein, the holes 102*a*, 104*a* are utilized to engage with the pivoting arms 106. The pivoting arms 106 facilitate the relative movement between the first member 102 and the second member 104, as required for the operation of the ring binder mechanism 100 in switching between its open and closed states. The design and implementation of the pivoting arms 106 ensure that the movement is both smooth and controlled, providing a reliable mechanism for daily use.

Figure 3:
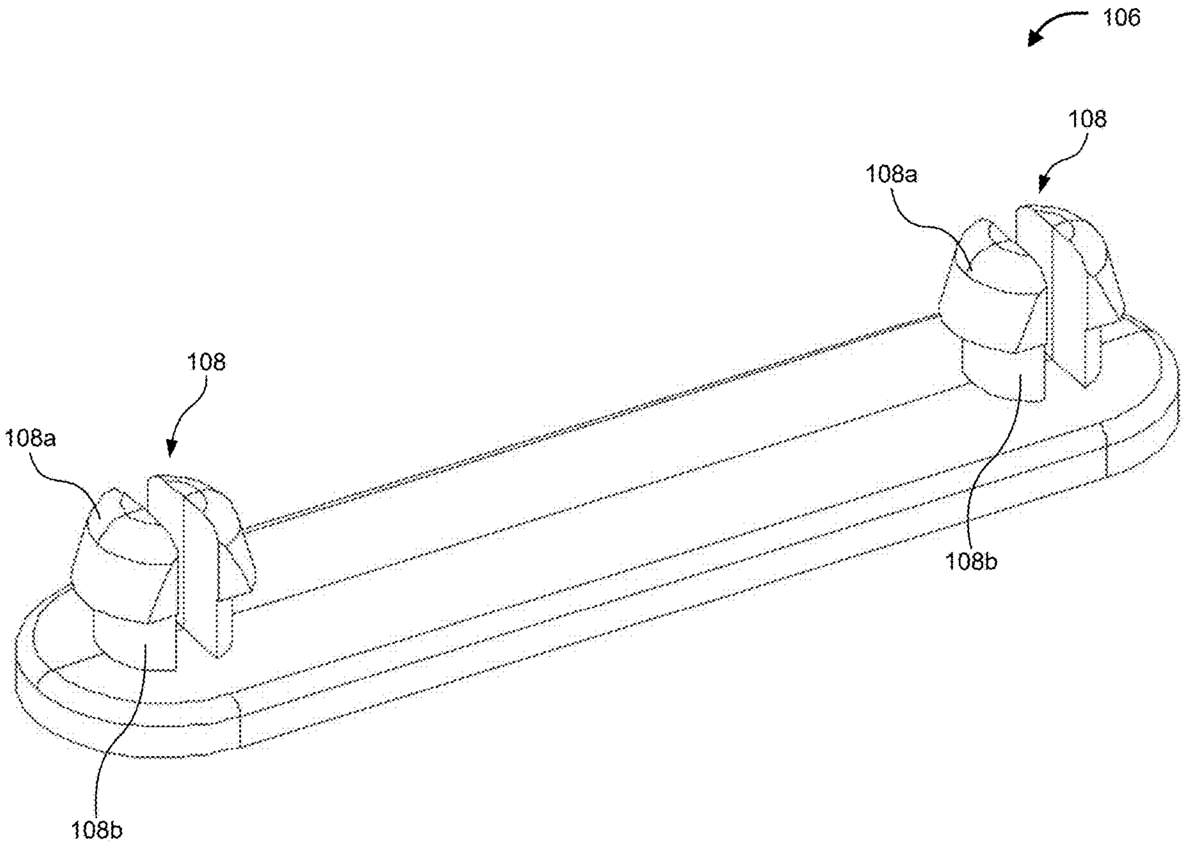
FIG. 3 illustrates a diagrammatic perspective view representation of a pivoting arm of the ring binder mechanism, in accordance with one or more embodiments of the present disclosure.

FIG. 3 illustrates a perspective view of the pivoting arm 106. Specifically, as better illustrated in FIG. 3, each of the one or more pivoting arms 106 comprises two protrusions 108 that are strategically positioned to interact with corresponding holes 102*a*, 104*a* formed in the first member 102 and the second member 104, respectively. The protrusions 108 are designed to fit snugly within the holes 102*a*, 104*a*, establishing a secure connection between the pivoting arms 106 and the first and second members 102, 104. This connection allows the second member 104 to pivot relative to the first member 102, enabling the ring binder mechanism 100 to transition between its open and closed positions. In the present embodiments, as illustrated in the protrusions 108 are further characterized by a design in which each protrusion 108 has a top portion 108*a* that is flexible and wider than its bottom portion 108*b*. This flexibility allows the top portion 108*a* of the protrusions 108 to deform slightly as they engage with the holes 102*a*, 104*a*, ensuring a secure fit and preventing accidental disengagement. The wider top portion 108*a* of each protrusion 108 also serves to distribute the forces acting on the pivoting arm 106, enhancing the overall durability and longevity of the ring binder mechanism 100.

It may be appreciated from FIGS. 1A and 1B, in consideration of FIGS. 2A and 2B, the pivoting members 106 may be accommodated inside of first member 102 and the second member 104, when the ring binder mechanism 100 is disposed in the closed position thereof. For this purpose, the first member 102 of the ring binder mechanism 100 may include a plurality of first slots, strategically positioned on its underside (hidden from view in the accompanying drawings). These first slots are designed to house and accommodate the one or more pivoting arms 106 when the ring binder mechanism 100 is in its closed position. In a complementary fashion, the second member 104 also includes a plurality of second slots, which are also not visible in the drawings. These second slots are aligned with the first slots on the first member 102. The purpose of these corresponding slots is to ensure the smooth and unimpeded movement of the pivoting arms 106 as the ring binder mechanism 100 transitions between its open and closed states. This configuration allows for the integration of the pivoting arms 106 within the overall structure of the ring binder mechanism 100, maintaining an unobtrusive appearance while ensuring optimal functionality.

Figure 4A:
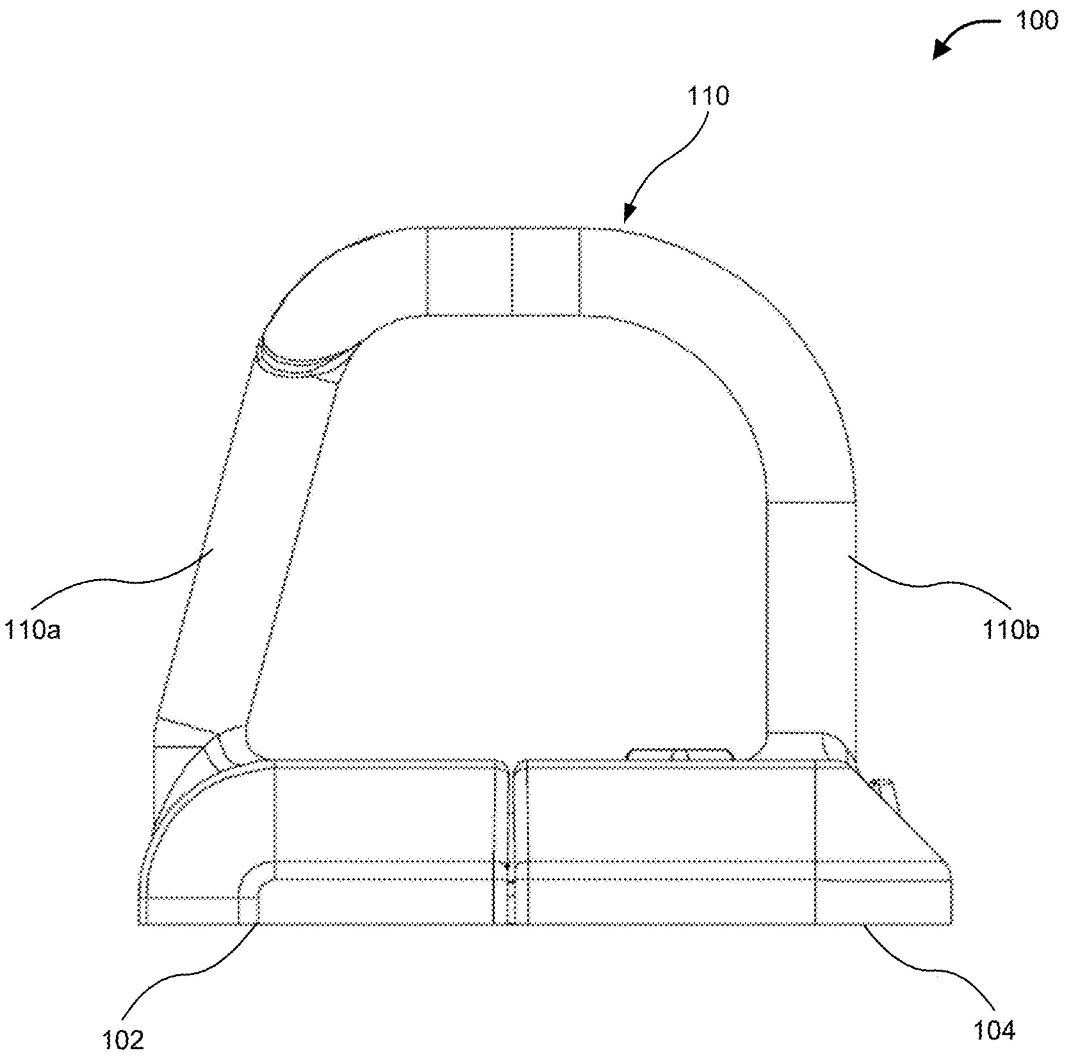
FIG. 4A illustrates a diagrammatic side view representation of the ring binder mechanism showing a plurality of rings therein in closed position thereof, in accordance with one or more embodiments of the present disclosure.
Figure 4B:
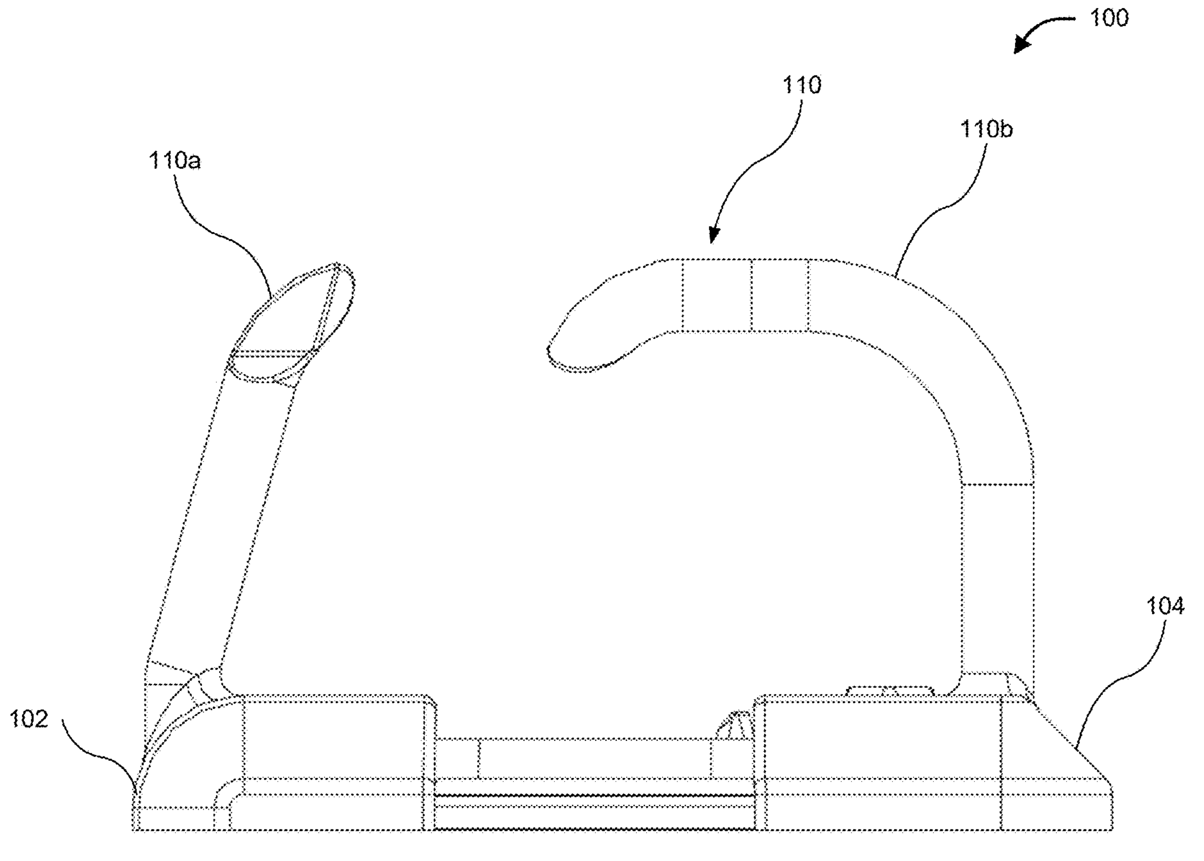
FIG. 4B illustrates a diagrammatic side view representation of the ring binder mechanism showing the plurality of rings therein in open position thereof, in accordance with one or more embodiments of the present disclosure.

Referring again to FIGS. 1A-1B and 2A-2B, the ring binder mechanism 100 further includes a plurality of rings 110. Herein, each ring 110 is divided into two distinct portions, including a first ring portion 110*a* and a second ring portion 110*b*. The first ring portion 110*a* is securely attached to the first member 102, while the second ring portion 110*b* is attached to the second member 104. This division of each ring 110 into two portions facilitates the pivoting action of the second member 104 relative to the first member 102. When the ring binder mechanism 100 is in the closed position, the first ring portions 110*a* and the second ring portions 110*b* align and interlock, forming complete rings 110 that securely hold the inserted documents (as shown in FIGS. 1A and 1B). FIG. 4A illustrates a side view of the ring binder mechanism 100, better illustrating the completed ring 110. This configuration ensures that the documents remain in place and are not easily dislodged. Conversely, when the ring binder mechanism 100 is in the open position, the first and second ring portions 110*a*, 110*b* separate from each other (as shown in FIGS. 2A and 2B). FIG. 4B illustrates a side view of the ring binder mechanism 100, better illustrating the separated ring 110 with the first and second ring portions 110*a*, 110*b* separate from each other. This configuration allows for the easy insertion or removal of documents.

Referring yet again to FIGS. 1A-1B and 2A-2B, as illustrated, the first member 102 of the ring binder mechanism 100 includes a locking element 112. Further, as illustrated, the second member 104 of the ring binder mechanism 100 includes a slot 114 formed therein. In the present configuration, the locking element 112 facilitates the secure closure of the ring binder mechanism 100. The locking element 112 of the first member 102 is designed to interact with the corresponding slot 114 formed in the second member 102. When the ring binder mechanism 100 is in its closed position, the locking element 112 is inserted into the slot 114, effectively locking the first member 102 and the second member 104 together. This interlocking mechanism ensures that the rings 110 remain closed, securely holding the documents or other materials. Further, the locking element 112 is configured to disengage from the slot 114 when applied with an external pressure, to allow for relative movement of the first member 102 and the second member 104 with respect to each other and dispose the ring binder mechanism 100 in the open position.

In particular, to open the ring binder mechanism 100, an external pressure is applied to the locking element 112, or, in general, any portion of the first member 102. This pressure causes the locking element 112 to disengage from the slot 114, allowing the second member 104 to pivot away from the first member 102. For this purpose, the second member 104 may be made to slide relative to the first member 102, to cause the second member 104 to rotate relative to the first member 102 due to connection with the pivoting arms 106 therebetween, and thereby the second member 104 pivots away from the first member 102. The design of the locking element 112 and the slot 114 ensures that the locking and unlocking actions are smooth, reliable, and require minimal effort from the user. It may be understood that the separation of the first and second members 102, 104 results in the opening of the rings 110 (i.e., division into the corresponding first ring portion 110*a* and second ring portion 110*b*), which in turn allows the user to add or remove documents (papers) as needed.

In the present embodiments, as illustrated, the ring binder mechanism 100 further comprises visual indicators 116 formed on the second member 104. The visual indicators 116 are designed to provide clear guidance to the user regarding the direction in which the second member 104 should be moved relative to the first member 102 when transitioning between the open and closed positions. The visual indicators 116 may take the form of arrows, symbols, or other markings that are readily visible and understandable to the user. In the non-limiting examples, as illustrated, the visual indicators 116 are shown in the form of arrows. The placement of the visual indicators 116 on the second member 104 ensures that they are easily accessible and can be referenced during operation of the ring binder mechanism 100. By providing clear visual cues, the visual indicators 116 facilitate the intuitive and efficient use of the ring binder mechanism 100, enhancing the overall user experience.

In present embodiments, the first member 102, the second member 104, the pivoting arms 106, and the rings 110 (including both the first ring portions 110*a* and the second ring portions 110*b*) of the ring binder mechanism 100 are all constructed from a polymer material. The utilization of a polymer material offers several advantages, including flexibility, durability, and lightweight. In a preferred embodiment, the polymer material is acrylonitrile butadiene styrene (ABS) polymer, known for its strength, rigidity, and resistance to impact. The selection of ABS polymer ensures that the ring binder mechanism 100 is robust enough to withstand regular use while remaining lightweight and easy to handle. The use of a consistent polymer material throughout the various components of the ring binder mechanism 100 also simplifies the manufacturing process. Further, the use of ABS polymer contributes to the overall recyclability of the ring binder mechanism 100.

Figure 5:
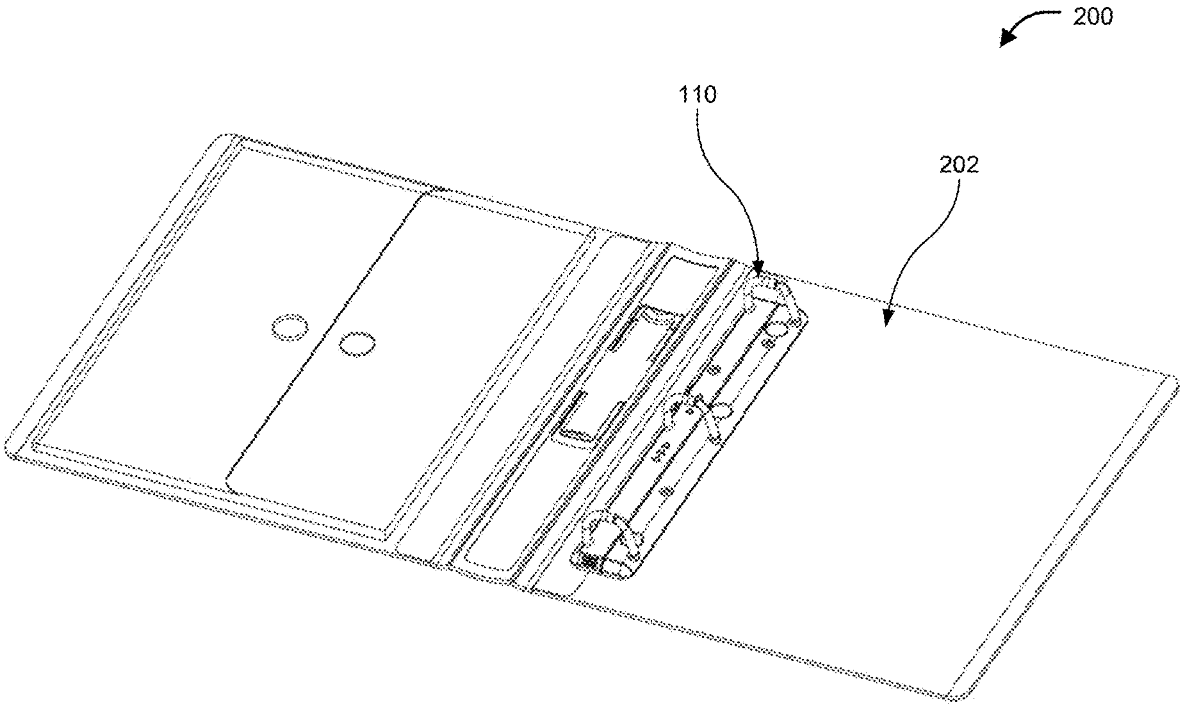
FIG. 5 illustrates a diagrammatic perspective view representation of a binder stationery with a binder file incorporating the ring binder mechanism, in accordance with one or more embodiments of the present disclosure.

Referring to FIG. 5, the present disclosure also provides a binder stationery 200, which is a combination of a binder file 202 and the ring binder mechanism 100. The term "binder file" refers more specifically to the part of the binder stationery 200 designed to hold and secure documents. The binder file 202 typically consists of a durable, often flexible cover that encases the ring binder mechanism 100 and includes additional elements designed for document storage, such as pockets or sleeves. The binder file 202 serves as a housing or container for documents or other materials to be organized and secured. The ring binder mechanism 100, as previously described, is integrated into the binder file 202 to provide a means of opening and closing the rings 110 for the insertion or removal of documents.

Figure 6A:
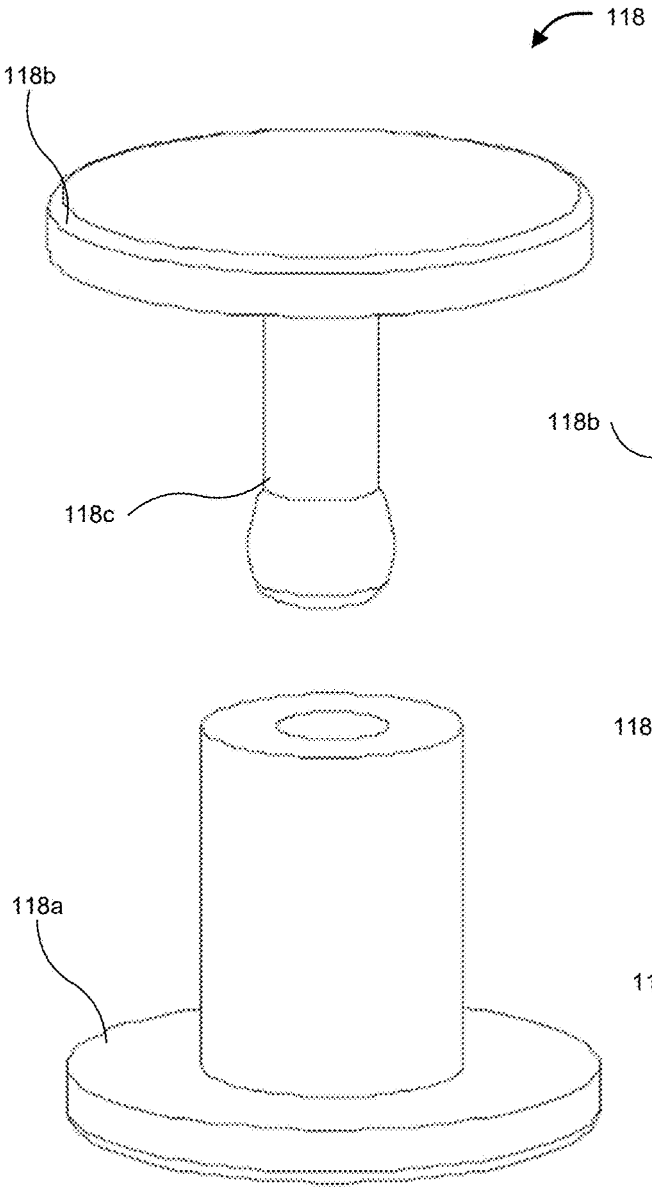
FIGS. 6A and 6B illustrate a diagrammatic perspective view representation of a fastener of the ring binder mechanism, in accordance with one or more embodiments of the present disclosure.
Figure 6B:
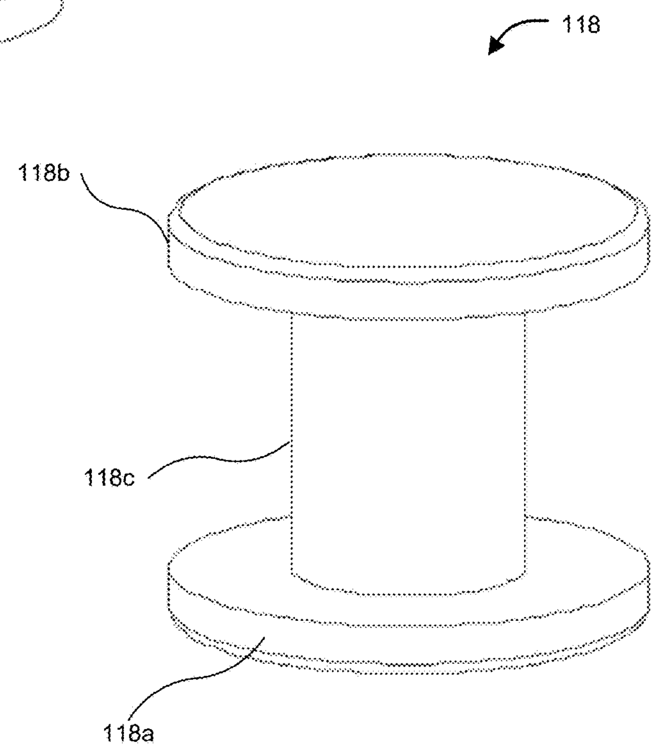

In the present embodiments, the ring binder mechanism 100 is securely attached to the binder file 202 through one or more fasteners 118. Herein, the fasteners 118 are configured to engage with apertures 102*b* in the first member 102 of the ring binder mechanism and corresponding apertures (not shown) in the binder file 202. This fastening mechanism, provided by the fasteners 118, ensures that the ring binder mechanism 100 remains firmly attached to the binder file 202, even when the binder file 202 is subjected to regular handling and use. FIGS. 6A and 6B illustrate the fastener 118. As shown, these fasteners 118 utilizes a two-part design that is tailored for efficient and secure fastening. Each fastener 118 includes a lower base 118*a* and an upper head 118*b*, connected by a central shaft 118*c*. In an example configuration, the lower base 118*a* is broad, providing a stable anchor point that sits flush against the surface of the binder file 202. The upper head 118*b* of the fastener 118 is slightly larger in diameter than the shaft, forming a lip that ensures the fastener 118 remains securely in place and sits flush once inserted into the apertures 102*b* of the first member 102. The central shaft 118*c* between the lower base 118*a* and the upper head 118*b* of the fastener 118 is of a diameter slightly smaller than the aperture 102*b*. This allows for a tight fit when the fastener 118 is inserted, providing frictional engagement which further secures the fastener 118 in place. The material of the fastener 118 is chosen for its durability and its ability to resist deformation under normal use conditions, ensuring that the fastener 118 maintains its grip even with frequent binder openings and closings.

In the present embodiments, the ring binder mechanism 100 features precise dimensions that are integral to its design and functionality. The total length of the ring binder mechanism 100 is measured at about 9.62 inches, which is suited to standard document sizes, ensuring that it can comfortably house typical A4 or letter-sized papers without extending beyond the edges of the binder file 202. This length also allows for a sufficient spacing between the rings 110, facilitating easy insertion and removal of papers without causing bending or damage to the documents. Furthermore, the width of the ring binder mechanism 100 is measured at about 1.495 inches. This dimension affects the stability of the ring binder mechanism 100 when mounted within the binder file 202. The width ensures that the ring binder mechanism 100 remains balanced and secure within spine of the binder file 202. This width is also optimized to accommodate the necessary components such as the locking element 112, pivoting arms 106, and the rings 110, while maintaining a sleek, compact profile that minimizes bulk and enhances the overall aesthetics of the binder file 202.

The ring binder mechanism 100 of the present disclosure is configured to be implemented in document organization systems, addressing several limitations found in traditional binders. The novel design of the ring binder mechanism 100, characterized by the first and second members 102, 104, pivoting arms 106, and locking element 112, enables a seamless and intuitive user experience. The ability to open and close the ring binder mechanism 100 with a simple application of external pressure to the locking element 112 eliminates the need for cumbersome snapping mechanisms or complex manipulations, making it easier and more convenient for users to add or remove documents. Additionally, the integration of visual indicators 116 on the second member 104 further simplifies the operation of the ring binder mechanism 100 by providing clear guidance to the user regarding the direction of movement required to open or close the rings 110. Furthermore, unlike traditional ring binder mechanisms that rely on metal components, the present ring binder mechanism 100 utilizes a polymer material for its construction. This material choice contributes to the lightweight and durable nature of the ring binder mechanism 100, and also enhances its recyclability, aligning with the growing demand for environmentally friendly products.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

I claim:

1. A ring binder mechanism comprising:

a first member having a locking element;

a second member pivotally connected to the first member by one or more pivoting arms; and a plurality of rings, each ring having:

a first ring portion on the first member, and a second ring portion on the second member, wherein:

the locking element is configured to engage with a slot formed in the second member, to lock the first member and the second member with respect to each other and dispose the ring binder mechanism in a closed position, the locking element is configured to disengage from the slot when applied with an external pressure, to allow for relative movement of the first member and the second member with respect to each other and dispose the ring binder mechanism in an open position, when the first member and the second member are in the closed position, the first ring portions and second ring portions are interlocked to form the respective rings, each of the one or more pivoting arms comprises two protrusions that engage with corresponding holes in the first member and the second member, to pivotally connect the second member to the first member, and each protrusion on the pivoting arms has a top portion that is flexible and wider than a bottom portion thereof, and wherein the top portions of the protrusions are configured to engage with respective holes in the first member and the second member.

2. The ring binder mechanism as claimed in claim 1, wherein the first member includes a plurality of first slots to accommodate the one or more pivoting arms when in the closed position, and the second member includes a plurality of second slots corresponding to the first slots.

3. The ring binder mechanism as claimed in claim 1 further comprising visual indicators formed on the second member to indicate to a user a direction in which the second member is to be moved with respect to the first member when transitioning between the open and closed positions.

4. The ring binder mechanism as claimed in claim 1, wherein the first member, the second member, the pivoting arms, and the rings are formed from a polymer material.

5. The ring binder mechanism as claimed in claim 4, wherein the polymer material comprises acrylonitrile butadiene styrene (ABS) polymer.

6. The ring binder mechanism as claimed in claim 1 further comprising one or more fasteners configured to engage with apertures formed in the first member and a binder file, to support the ring binder mechanism with the binder file.

7. A binder stationery comprising:

a binder file; and a ring binder mechanism comprising:

a first member having a locking element;

a second member pivotally connected to the first member by one or more pivoting arms;

a plurality of rings, each ring having:

a first ring portion on the first member, and a second ring portion on the second member, and one or more fasteners configured to engage with apertures formed in the first member and the binder file, to support the ring binder mechanism with the binder file, wherein:

the locking element is configured to engage with a slot formed in the second member, to lock the first member and the second member with respect to each other and dispose the ring binder mechanism in a closed position, the locking element is configured to disengage from the slot when applied with an external pressure, to allow for relative movement of the first member and the second member with respect to each other and dispose the ring binder mechanism in an open position, when the first member and the second member are in the closed position, the first ring portions and second ring portions are interlocked to form the respective rings, each of the one or more pivoting arms comprises two protrusions that engage with corresponding holes in the first member and the second member, to pivotally connect the second member to the first member, and each protrusion on the pivoting arms has a top portion that is flexible and wider than a bottom portion thereof, and wherein the top portions of the protrusions are configured to engage with respective holes in the first member and the second member.

8. The binder stationery as claimed in claim 7, wherein the first member, the second member, the pivoting arms, and the rings are formed from a polymer material.

* * * * *